United States Patent [19]
Hashiguchi et al.

[11] 3,889,915
[45] June 17, 1975

[54] COLLAPSIBLE REAR VIEW MIRROR APPARATUS

[75] Inventors: Setsuo Hashiguchi, Yamato; Tatsuo Watanabe, Isehara, both of Japan

[73] Assignee: Ichiko Industries Limited, Tokyo, Japan

[22] Filed: July 16, 1973

[21] Appl. No.: 379,335

[30] Foreign Application Priority Data
July 19, 1972  Japan.............................. 47-84293

[52] U.S. Cl............................................ 248/475 B
[51] Int. Cl. .............................................. B60r 1/02
[58] Field of Search........ 248/475 B, 481, 482, 483; 403/90

[56] References Cited
UNITED STATES PATENTS
| | | | |
|---|---|---|---|
| 3,409,317 | 11/1968 | Richards........................... | 403/90 X |
| 3,583,734 | 6/1971 | Magi............................... | 248/478 X |
| 3,784,149 | 1/1974 | Brudy .............................. | 248/478 |

FOREIGN PATENTS OR APPLICATIONS
| | | | |
|---|---|---|---|
| 743,641 | 12/1943 | Germany ........................... | 248/481 |
| 1,023,077 | 12/1952 | France................................. | 403/90 |

*Primary Examiner*—William H. Schultz
*Attorney, Agent, or Firm*—Wenderoth, Lind & Ponack

[57] ABSTRACT

A collapsible rear view mirror apparatus comprises a rear view mirror, a mirror arm, a support member to be fixed to an automobile body, and a ball-and-socket joint constituted by a ball element, a first socket element to be fixedly attached to the support member, and a second socket element movable within this support member. The ball element is secured to the base portion of the mirror arm. The ball element has at least one ridge on its surface. The second socket element has on its concave surface at least one recess complementary in shape to said ridge. This ridge is detachably fitted in said recess and urged toward the first socket element by a spring provided between the second socket element and the inner wall of the support member, so that the mirror arm is supported stationary by the support member via the ball-and-socket joint in normal use. Upon application of a substantial external force to the mirror or the arm, the engagement between the ridge and the recess will be released, permitting a free rotation of the arm about the ball element, allowing the arm to fall down. Thus, the apparatus will never injure a passer-by nor damage any outside object or the mirror and the arm at time of collision.

5 Claims, 7 Drawing Figures

PATENTED JUN 17 1975

3,889,915

SHEET 1

COLLAPSIBLE REAR VIEW MIRROR APPARATUS

BACKGROUND OF THE INVENTION

1. Field of the invention

The present invention relates to a rear view mirror apparatus attached to the outside of the body of automobiles, for example, to the fender, and more particularly, it pertains to a collapsible rear view mirror apparatus such that, whenever a substantial external force is applied thereto, both the mirror per se and the mirror arm are caused to jointly fall down immediately.

2. Description of the prior art

Mirror devices which are adapted to be attached to the front fender of automobiles maintaining their proper positions normally for the cause of safety driving but which are arranged so that the mirror and its arm are caused to fall down or rotated instantaneously whenever a substantial external force is applied thereto are well known in the art.

Such mirror devices of the prior type as stated above are disclosed, for example, in Japanese Pat. Publication No. 46-26690 (1971). In this publication, the mirror device is shown to have the following arrangement, i.e., the cylindrical base portion of the mirror arm is fitted into the cylindrical hole provided in the base-seat to establish a releasable engagement between the recesses formed on said base portion and the projections formed inside said hole. Whenever a substantial external force is applied to this known mirror device, said projections are forcibly released from their mating recesses so that the mirror arm is rendered rotatable. This mirror stay, however, is rotatable only in a horizontal plane, and therefore it is not allowed to make a sufficient rotation when an external force is applied to the mirror device vertically. Thus, this known mirror is never safe on such an occasion.

Another known collapsible rear view mirror device is disclosed in Japanese Utility Model Publication No. 46-35798 (1971). In this collapsible rear view mirror device, the base portion of the mirror arm is seated in the base-seat by means of a compression coil spring to be operative so that, whenever an external force is applied thereto, the arm will fall down against the tensile force of the spring. The rear view mirror device of this type, however, has the drawbacks that, in case the spring has an excessively strong tensile force, the arm will not fall easily as desired and that, on the other hand, in case the spring is insufficiently strong in its tensile force, the arm supporting the rear view mirror is liable to be shaken during its normal use.

SUMMARY OF THE INVENTION

It is, therefore, an object of the present invention to provide a collapsible rear view mirror apparatus to be provided outside the body of a vehicle, which is such that its mirror and arm can fall down or can be rotated about a ball-and-socket joint without fail upon application thereto of a substantial external force regardless of the direction of said force and that this apparatus will never give rise to any problem during its normal use.

Another object of the present invention is to provide a collapsible rear view mirror apparatus of the type described which is simple in construction and can be produced at a low cost.

These and other objects as well as advantages of the present invention will become apparent from the following description when taken in conjunction with the accompanying drawings.

BRIEF DESCRIPTION OF THE DRAWINGS

FIG. 8 is an exploded perspective view of the elements constituting a ball-and-socket joint of a further preferred embodiment of the collapsible rear view mirror apparatus, with one of the socket elements being broken away for clarity's sake.

DETAILED DESCRIPTION OF PREFERRED EMBODIMENTS

Figure 1:
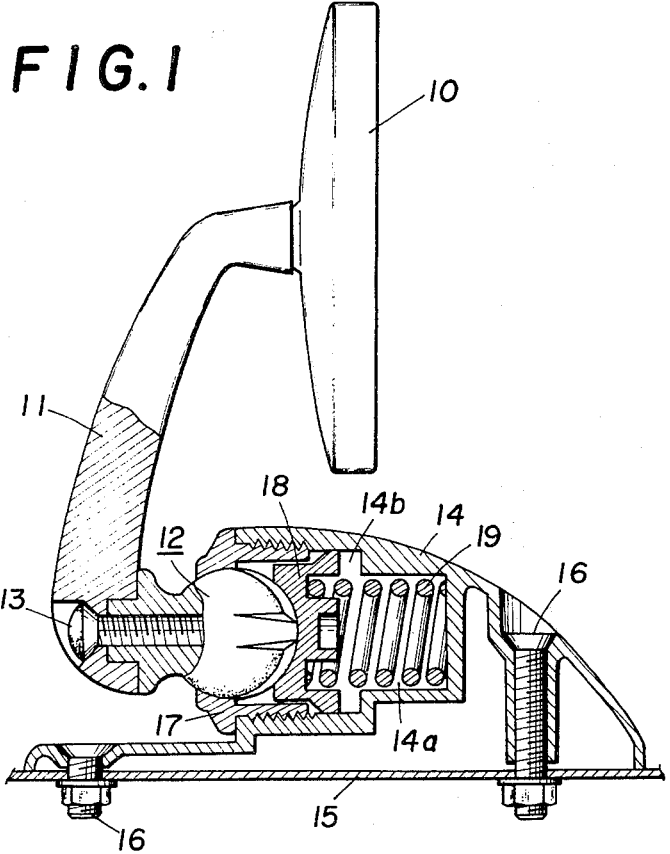
FIG. 1 is a longitudinal sectional view of a preferred embodiment of the collapsible rear view mirror apparatus according to the present invention in its state of being attached to a fender of an automobile, with parts partially illustrated in side elevation.

The collapsible rear view mirror apparatus according to the present invention may be attached to an outside part of an automobile such as the front fender, the window sill or the front pillar and also to an inside part of the automobile such as the dash board.

In the preferred embodiments of the present invention shown, by way of example, in the accompanying drawings, the rear view mirror apparatus will be described as being one designed to be attached to an outside part of an automobile, and like reference numerals designate like parts that have the same function throughout the specification and the drawings of the embodiments.

Description will be directed first to a preferred embodiment illustrated in FIGS. 1 to 4. In this embodiment, a mirror 10 is attached to one end of a mirror arm 11 via a mirror angle adjusting means such as a ball-and-socket joint. At the other end of this arm 11 is provided a ball element 12. This ball element 12 constitutes a ball-and-socket joint in cooperation with a first socket element indicated generally at 17 and fixed to a support member 14 and with a second socket element indicated generally at 18 and movable within said support member 14. This support member 14 has an inner space to house therein the aforesaid elements constituting the ball-and-socket joint as well as a coil spring. The ball element 12 is held between these first and second socket elements 17 and 18 by means of the coil spring 19 urging the second socket element 18 toward the first socket element 17. The support member 14 is fixed to the exterior surface of a fender 15 by two bolts 16.

Figure 2:
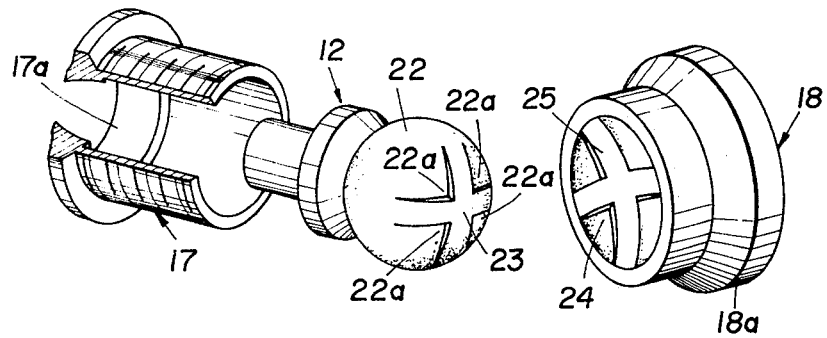
FIG. 2 is an exploded perspective view of the elements constituting a ball-and-socket joint of the collapsible rear view mirror apparatus shown in FIG. 1.
Figure 3:
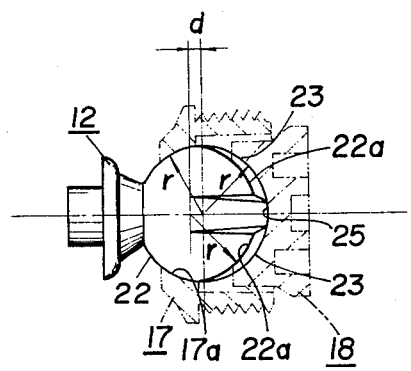
FIG. 3 is a longitudinal sectional view, illustrating the arrangement of said ball-and-socket joint.

The ball element 12 of the ball-and-socket joint has, as shown in FIGS. 2 and 3, of a spherical surface 22 formed to have a radius $r$. This spherical surface 22 has, on that surface portion at sites away from the surface portion which is coupled via a suitable coupling means to the mirror arm 11, spherically-surfaced cross-shape ridges 23 formed by partially removing four portions of the ball element 12 located adjacent to the ridges 23, thus providing four spherically-surfaced recessed sectors 22a at the respective sides of the cross-shape ridges 23. It should be noted that the respective ends of the cross-shape ridges 23 smoothly join the spherical surface 22 to thereby constitute a part of this spherical surface 22.

It should also be noted that the spherical surfaces of the ridges 23 represent the loci of the same radius $r$ extending from the center of the spherical surface 22, and that each of the surfaces of said spherically-surfaced recessed sectors 22a represents the loci of the same radius $r$ but extending from a different center which is deviated by a distance $d$ from the center of the spherical surface 22, as shown in FIG. 3.

As shown in FIG. 1, the ball element 12 is secured in stationary fashion to the mirror arm 11 at said other end of the arm away from said one end at which the mirror 10 is attached. More specifically, the ball element 12 is secured to the base portion of the arm 11 by means of a fastening means such as a bolt 13 which is screwed through a hole formed in the base portion of the arm 11 into a female screw formed in the ball element 12. Owing to this technique of fastening the ball element 12, not only the mounting of the apparatus onto the body part of an automobile but also the production and packing of the parts are facilitated. The ball element 12 is supported between a semi-spherical surface 17a of the first socket element 17 screwed into the support member 14 and the movable second socket element 18 housed within the latter. The ball element 12 and the second socket element 18 are both urged toward the first socket element 17 by the spring force of the coil spring 19 provided between this second socket element 18 and the inner wall of said support member 14.

Referring now particularly to FIG. 2, the second socket element 18 has a concave semi-spherical surface 24 which has a radius $r$ equal to that of the spherical surface 22 of the ball element 12. In this concave semi-spherical surface, spherically-surfaced cross-shape recesses 25 each having a radius $r$ equal to that of the concave semi-spherical surface 24 are formed, with their imaginary common center deviating by a distance $d$ from the imaginary center of the semi-spherical surface 24. It should be understood that this deviation distance $d$ is equal to said distance $d$ of deviation previously mentioned in connection with the ball element 12 and the cross-shape ridges 23. Accordingly, it should also be understood that the spherically-surfaced recesses 25 are complementary in configuration and location to said spherically-surfaced cross-shape ridges 23, respectively, to snugly receive these ridges therein during normal use.

A rear surface on the reverse side of the semi-spherical surface 24 of the second socket element 18 is provided with a recessed spring seat, as seen in FIG. 1. The coil spring 19 which is housed as a whole within an inner chamber 14a of the support member 14 is received in this recessed spring seat to bear against said rear surface of the second socket element 18. Due to the spring force of this coil spring 19, the cross-shape ridges 23 are fitted in the spherically-surfaced cross-shape recesses to firmly hold the ball element 12 between the socket elements 17 and 18, thereby positioning both the mirror arm 11 and the mirror in place during normal condition. The second socket element 18 is also provided, around its base portion, with a flange 18a which is slidably fitted in another inner chamber 14b of the support member 14 to permit the horizontal translation of this second socket element 18 in this inner chamber 14b.

In normal use, as shown in FIG. 1, the spherical surface 22 of the ball element 12 is engaged with the semi-spherical surface 24 of the second socket element 18, and these ball element 12 and second socket element 18 are urged toward the first socket element 17 by means of the coil spring 19 so that the present apparatus including the mirror 10, is held in the predetermined position so long as no substantial external force is applied to, for example, the upper portion of the mirror arm 11.

Let us now assume that a substantial external force is applied to the mirror 10 or the mirror arm 11, for example, due to a collision of the mirror or the stay against a person or an object. The ball element 12 will thereupon receive a force causing it to rotate within the socket elements, and this force will, in turn, cause spherically-surfaced cross-shape ridges 23 to be detached out of their mating spherically-surfaced cross-shape recesses 25 and to bear against the concave semi-spherical surface 24 of the second socket element 18, compressing the coil spring 19. Once these spherically-surfaced cross-shape ridges 23 are caused to bear against the concave semi-spherical surface 24, the ridges 23 and the surface 24 will have a co-axial center so that the ball element 12 and accordingly the mirror stay 11 may now be freely rotated, allowing the mirror arm 11 and the rear view mirror 10 to pivot downwardly about the ball-and-socket joint.

When it is desired to restore the normal position of the mirror arm 11 which has fallen down, it will be sufficient to erect this arm 11 manually, causing the ridgas 23 to be re-engaged in their mating recesses 25.

As described above, the collapsible rear view mirror apparatus according to the present invention has the advantages that the rear view mirror and the mirror stay are allowed to jointly fall down instantaneously upon application thereto of a substantial external force, irrespective of the direction of such force, and that this apparatus will function concurrently as a shock-absorber also, thereby keeping passers-by and objects as well as its own rear view mirror from being injured or damaged.

Figure 5:
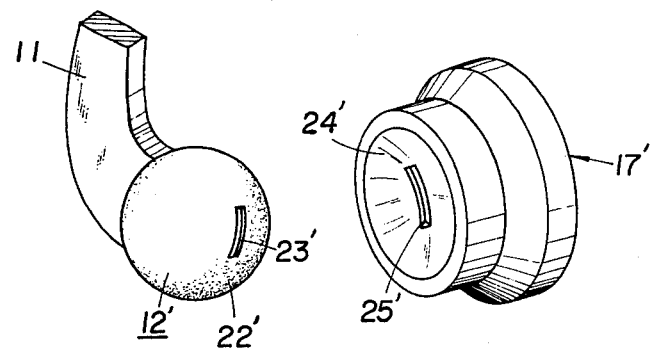
FIG. 5 is an exploded perspective view of the elements constituting a ball-and-socket joint of the collapsible rear view mirror apparatus shown in FIG. 4, with one of the socket elements being broken away for clarity's sake.

It should be noted that, although the mirror arm 11 and the ball element 12 are separately fabricated in the foregoing embodiment, these two members may be shaped as an integral body as shown in FIG. 5.

It should be noted also that, although the ridges 23 have a cross-shape in the foregoing embodiment, the ridges may be formed in a single one having I-shape or Y-shape.

Figure 4:
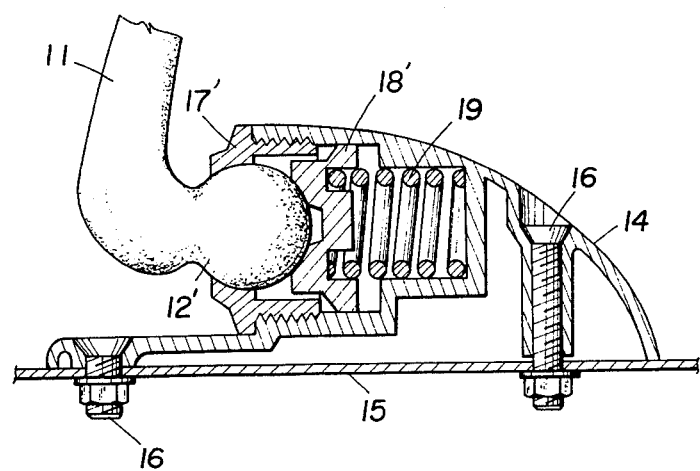
FIG. 4 is a longitudinal sectional view of another preferred embodiment of the collapsible rear view mirror apparatus of the present invention, with parts partially illustrated in side elevation and a part of the stay being broken away.

Another type of collapsible rear view mirror apparatus according to the present invention as shown in FIGS. 4 and 5 is similar to the aforesaid collapsible rear view mirror apparatus with the only exception of the configuration of the ball element 12' and the second socket element 18'. More specifically, the ball element 12' is formed integrally with the mirror arm 11, and the spherical surface 22' of the former has, on that surface portion away from the surface portion which is integrally connected to the mirror arm 11, a projecting ridge 23' which, in turn, has a substantially triangular cross-sectional configuration and an I-shaped external appearance as viewed from the front, with one side of this triangle lying on the spherical surface 22' in a manner as shown in FIG. 5. This I-shaped ridge 23' has an apex edge line curved substantially parallel with the spherical surface 22' as viewed from the side. The concave semi-spherical surface 24' of the second socket element 18' is provided with the I-shaped recess 25' which is complementary in configuration and location to the I-shaped ridge 23' projecting from the spherical surface 22. In its normal use, the ridge 23' is fitted in the recess 25' to hold the mirror stay in place.

Figure 6:
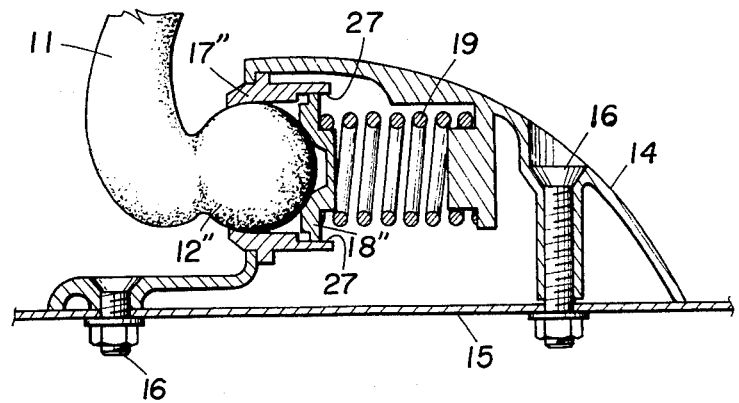
FIG. 6 is a longitudinal sectional view of still another preferred embodiment of the collapsible rear view mirror apparatus of the present invention, with parts partially illustrated in side elevation and a part of the arm being broken away.
Figure 7:
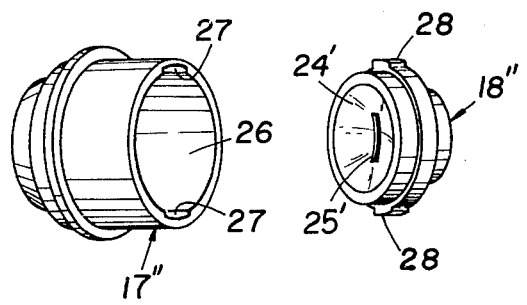
FIG. 7 is an exploded perspective view of the socket elements of the ball-and-socket joint of the collapsible rear view mirror apparatus shown in FIG. 6, with the ball missing for clarity's sake.

Still another embodiment of the collapsible rear view mirror apparatus according to the present invention is shown in FIGS. 6 and 7. This apparatus is similar to the preceding embodiment shown in FIGS. 4 and 5 with the only exception of the configuration of the first and the second socket elements 17'' and 18''. More specifically, as shown in FIGS. 6 and 7, the first socket element 17'' is fixedly attached to the support member 14 inside this member, and the second socket element 18'' is slidably housed within the first socket element 17''. To this end, the first socket element 17'' has a bore 26 which is provided, on its inner surface, with two grooves 27. Circumferentially of the second socket element 18'' at sites corresponding to the positions of said grooves 27, there are provided two lugs 28 and 28 which are fittable in said grooves 27, respectively, so that they can be received snugly in said grooves, permitting the translational movement of the second socket element 18'' in these grooves.

A further type of collapsible rear view mirror apparatus according to the present invention as shown in FIG. 8 is similar to the apparatus shown in FIGS. 1 to 3 with the exception of the configuration of the ridge and the recess. More specifically, in the apparatus shown in FIG. 8, the spherical surface 221 of the ball element 121 has, on that surface portion away from the surface portion which is to be connected to the mirror arm, a Y-shaped ridge 231 which is formed by spherically-surfaced recessed sectors 221a located adjacent to the Y-shaped ridge 231. Each hand of the Y-shaped ridge 231 is equally spaced apart. The concave-spherical surface 241 of the second socket element 181 is provided with the Y-shaped recess 251 which has a configuration complementary to that of the ridge 231.

Since these latter two embodiments described above have functions and advantages similar to those of the first embodiment shown in FIGS. 1 to 3, a detailed explanation thereof is omitted.

We claim:

1. A collapsible rear view mirror apparatus for an automobile, comprising:
    a rear view mirror;
    a support member adapted to be fixed to the body of the automobile;
    a ball and socket joint comprised of a ball element and at least two socket elements, one of said socket elements being fixed to said support member, a second socket element being movable with respect to said support member, said ball element having at least one substantial ridge on its spherical surface portion away from the portion thereof adjacent to said fixed socket element, said ridge having a spherical surface, the radius thereof being identical with the radius of the spherical surface of said ball element, said other movable socket element having at least one recess complementary in configuration and location to said ridge for receiving said ridge therein;
    a mirror arm arm having two ends, one end holding said rear view mirror, the other end being secured to said ball element, said mirror arm being thereby secured to said support member; and
    a coil spring provided between said support member and said movable socket element to urge both said ball element and said movable socket element toward said one fixed socket element so that said ridge is fitted in said recess, thereby holding said mirror arm in place.

2. A collapsible rear view mirror apparatus according to claim 1, in which the center of the spherical surface of said ridge is identical with the center of said ball element, said ridge thus constituting a part of the spherical surface of said ball element and thus providing, on its sides, spherically-surfaced recessed portions representing the loci of said radius but the center thereof being deviated from the center of the ball element toward the surface portion of said ball element adjacent to said fixed socket element.

3. A collapsible rear view mirror apparatus according to claim 2, in which said ridge has a spherically-surfaced cross-shape, and said recess has a configuration complementary to that of said ridge and has a radius equal to that of said ball element and has its imaginary center deviated outwardly for a distance equal to the distance of deviation of the center of said spherically-surfaced recessed portion.

4. A collapsible rear view mirror apparatus as recited in claim 1 wherein said ridge has a configuration complementary to that of said ridge.

5. A collapsible rear view mirror apparatus as recited in claim 1 wherein said ridge has a Y-shape and said recess has a configuration complementary to that of said ridge.

* * * * *